United States Patent
Perander et al.

(10) Patent No.: US 6,918,954 B2
(45) Date of Patent: Jul. 19, 2005

(54) COLLOIDAL SILICATE DISPERSION, METHOD FOR ITS PREPARATION AND ITS USE

(75) Inventors: Michael Perander, Pargas (FI); Jean Le Bell, St Karins (FI)

(73) Assignee: Paroc Group Oy AB, Vantaa (FI)

( * ) Notice: Subject to any disclaimer, the term of this patent is extended or adjusted under 35 U.S.C. 154(b) by 0 days.

(21) Appl. No.: 10/297,917

(22) PCT Filed: Jun. 19, 2001

(86) PCT No.: PCT/FI01/00578
§ 371 (c)(1),
(2), (4) Date: May 19, 2003

(87) PCT Pub. No.: WO01/97963
PCT Pub. Date: Dec. 27, 2001

(65) Prior Publication Data
US 2004/0011246 A1 Jan. 22, 2004

(30) Foreign Application Priority Data
Jun. 20, 2000 (FI) .............................. 20001458

(51) Int. Cl.$^7$ .............................................. C09D 1/02
(52) U.S. Cl. .................. 106/18.12; 106/38.3; 106/38.8; 106/38.9; 106/481; 106/483; 106/486; 516/78; 516/80; 501/12
(58) Field of Search ............................ 106/18.12, 38.3, 106/38.8, 38.9, 481, 483, 486; 501/12; 516/78–80

(56) References Cited

U.S. PATENT DOCUMENTS

| 3,993,499 A | * 11/1976 | Jacobson et al. ............ 106/483 |
| 4,533,393 A | 8/1985 | Neuschaeffer et al. |
| 4,913,840 A | * 4/1990 | Evans et al. ................... 516/79 |
| 5,254,327 A | 10/1993 | Martinez et al. |

FOREIGN PATENT DOCUMENTS

| EP | 0 059 088 | 9/1982 |
| HU | P8705883 A | 6/1991 |
| HU | P0105380 A | 8/2002 |

OTHER PUBLICATIONS

Derwent Publication No. AN 1993–16 4151, dated Apr. 20, 1993. See PCT search report.

* cited by examiner

Primary Examiner—C. Melissa Koslow
Assistant Examiner—S. S. Manlove
(74) Attorney, Agent, or Firm—Armstrong, Kratz, Quintos, Hanson & Brooks, LLP

(57) ABSTRACT

The present invention is directed to a colloidal aqueous silicate dispersion containing silica and alumina, the molar ratio between silica and alumina being 2–12, as well as to a method for its preparation. Said method is characterized by dissolving a particulate mineral material, such as a mineral wool or fiber product containing silica and alumina in a molar ratio of 2–12 in an aqueous solution, nucleating and stabilizing the so obtained solution, and optionally adjusting the dry matter content of the dispersion so obtained. The said dispersion can also be made to gel. The invention is also directed to the use of the dispersion as a binder.

10 Claims, 2 Drawing Sheets

COLLOIDAL SILICATE DISPERSION, METHOD FOR ITS PREPARATION AND ITS USE

FIELD OF THE INVENTION

Figure 1:
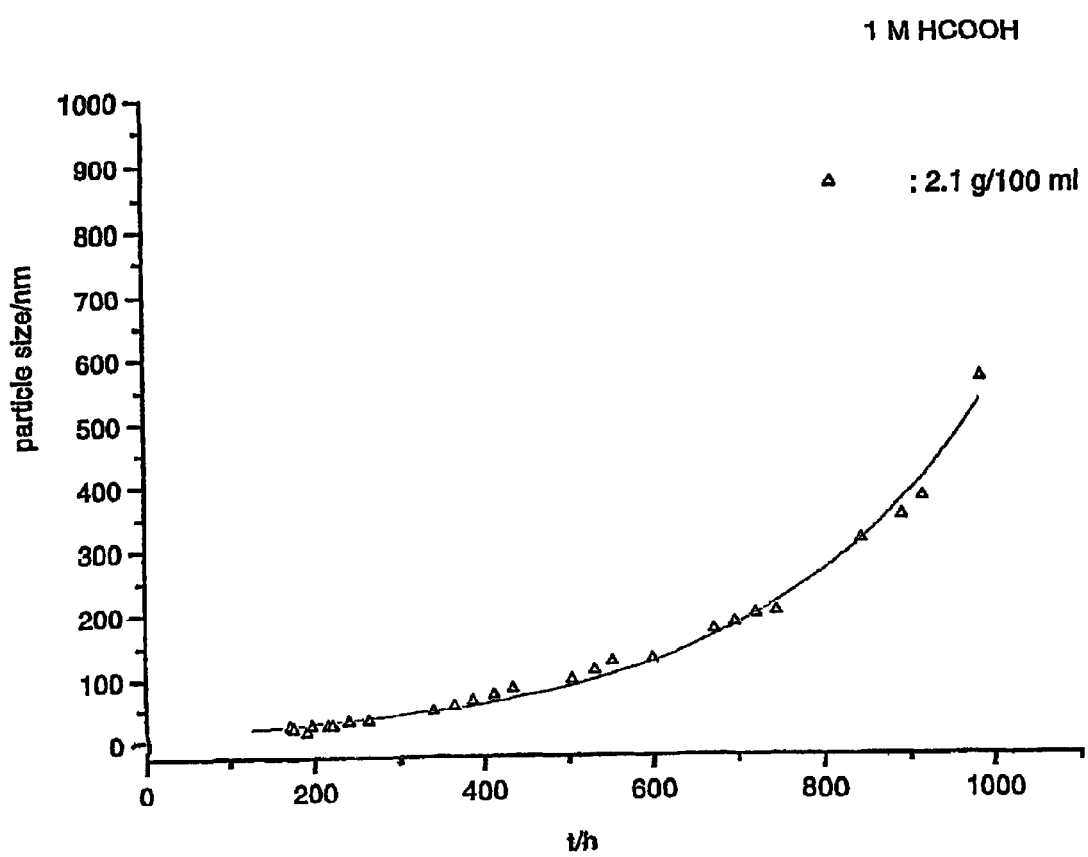

The present invention relates to colloidal silicate dispersions, preferably having a low alkali content and containing in addition alumina, as well as to gels formed from such dispersions through coagulation or gel formation. The invention is also related to a method for the preparation of such dispersions, using silica and alumina containing particulate silicate mineral raw materials. In addition, the invention is directed to the use of the dispersions so obtained, especially as a material with binding capacity, i.e. as a binding agent, or as a binding component in a binder composition, including the use as a coating substance or adhesive, or as a binding component in coating and adhesive compositions. In particular the materials of the invention find use in construction materials, in particular as a binder in mineral wool production, or in cementitious or concrete products.

BACKGROUND OF THE INVENTION

Water glass is traditionally made by melting silica sand with sodium or potassium carbonate at a very high temperature and then dissolving the finely divided solidified product in water. Thus water glass can be considered an ecologically acceptable substance to include in construction materials, such as a binder in mineral wool products or in cementitious products. Water glass has also been used as a binder in raw material briquettes for mineral wool production, or as binders for making foundry molds or cores, or for use as coating substances and adhesives. Thus for example DE 28 04 069 refers to a method of producing an insulating product by binding mineral fibres with water glass.

One disadvantage relating to the use of water glass is, however, that its manufacture uses pure raw materials and is very energy consuming. Another disadvantage is that such water glass is a highly alkaline product, which can cause stability problems, for example when used as a binder in cementituous products. Water glass typically has a RB ratio (the molar ratio $SiO_2/Na_2O$) of from appr. 1 to 4, the ratio of commercial water glass being typically appr. 3.3.

It is also known to use a mixture of water glass with other substances for various purposes, such as with clay or cement as a binder for mineral wool products, see e.g. SE 420 488. Such a product, although providing good water and heat resistance, has poor compression resistance, is brittle and causes dusting. The EP B 466 754 on the other hand describes the use of a binder made from slag activated with water glass for making a temperature and moisture resistant mineral wool product which is also capable of withstanding high temporary loads.

EP 59 088 describes high alkali silicate solutions to be used for binding purposes, especially for foundry moulds and cores, which solutions are made by dissolving finely divided silica powder into an alkaline solution, the resultant solution having a Rs value of 1.6 to 3.5. The silicate solutions so prepared have a low alumina content, typically below 2%.

SUMMARY OF THE INVENTION

In a first aspect, the present invention is directed to a colloidal aqueous silicate dispersion, i.e. a silicate containing sol, suitable for use as a binding agent, the dispersed binding component being preferably based on a mineral material and having a content of silicium and aluminium, calculated as their respective oxides, in a suitable ratio, that is expressed as the molar ratio between silica and alumina, i.e. $SiO_2/Al_2O_3$, to provide a stable product for a variety of uses. According to the invention, the ratio between the silica moles to the alumina moles in the dispersion is in the range of 2–12, that is 2:1–12:1. Preferably such a ratio is 2.5–8, and advantageously 3.5–6.

The present invention is also directed to a method for the preparation of such dispersions, according to which method a particulate silicate mineral material containing silica and alumina in a molar ratio of 2–12 is dissolved in an aqueous solution, to form a solution containing nucleated re-precipitated particles from the material, stabilizing the solution to form a dispersion, and optionally adjusting the dry matter content of the dispersion.

It is also within the scope of the invention to destabilize or coagulate the dispersion to form a gel. Such gel formation can take place by various methods known in the art, such as by changing the pH of the dispersion, or adding an electrolyte, such as a salt, or by removing water from the dispersion.

The present invention is also directed to the use of the silicate dispersion according to the invention. Such uses include the use as a binder for example in mineral wool production, or in the formation of raw material briquettes for mineral wool production, or in metal ore briquettes, or as binders in foundry moulds and cores. It is also possible to use the dispersions as an additive to cement or in addition to cement for example in concrete products, where they, due to the increased proportion of alumina, accelerate the binding process and act as strengtheners. Further uses include the use as coating materials in applications where traditionally conventional water glass or silica sols or silica particles such as "aerosil" or fly ash have been used. They are especially suitable for the preparation of fire resistant coatings, which due to the high alumina content of the dispersion show improved stability as compared to ordinary high alkali water glasses, the alumina providing for improved glassiness and reduced crystallinity of the silicate binder. The dispersions according to the invention can also be used as a fire resistant adhesive, for example for wood, concrete, bricks, glass, metal, plywood, and plasterboard manufacture. A particular use is found in the glueing of laminates, for example when laminating mineral wool layers, or as an adhesive for gluing mineral wool, for example to a metal, such as a metal sheet, so as to form construction panels.

DETAILED DESCRIPTION OF THE INVENTION

According to the invention an improved and economically feasible silicate binder material has been provided, which has excellent binding, strengthening and fire resistant properties and is also acceptable from a use or labour hygiene point of view. In addition, the binder according to the invention can be manufactured from inexpensive and easily available raw materials, or by-products, in a simple manner, allowing for the tailor-making of or designing the composition of the dispersion to suit the desired purpose. An important advantage is that the dispersion according to the invention presents no ecological load on the environment, but contains only such components that are already inherently present in nature.

According to a preferred embodiment of the invention, the dispersion according to the invention has, in contrast to traditional water glass, a low alkali content, that is, it has a low content of alkali oxides, in particular sodium and potassium oxides. According to a further advantageous embodiment, the dispersion according to invention contains earth alkali metal oxides, such as calcium and/or magnesium oxides; and/or iron oxides. Such an embodiment gives i.a. improved water resistance due to the fact that the aqueous solublilty of earth alkali metals is inferior to that of the alkali metals.

The low alkalinity makes the dispersion usable in a number of applications where a low alkalinity is desired, for example as a binder in concrete.

According to an embodiment of the invention, the colloidal dispersion contains silica and alkali oxide in a molar ratio, that is the ratio of the silica moles to the sum of the alkali oxide moles, i.e. essentially the sum of the sodium oxide moles and/or the potassium oxide moles, which is in the range of 10–350, preferably 15–150. The desired molar ratio can be obtained by properly selecting the starting mineral raw material to be used for making the dispersion.

According to a further embodiment of the invention, the dispersion contains calcium and/or magnesium oxide and/or iron oxide, wherein the molar ratio between silica and the sum of calcium, magnesium and iron oxide is in the range of 0.5–2, preferably 0.6–1.5. The iron oxide is calculated in the form of FeO.

According to a preferred embodiment, the primary particle size of the dispersion is 1 to 1000 nm, preferably 10 to 100 nm.

The dry matter content of the dispersion can vary, depending on the intended application, but for most purposes a dry matter content above 1%, such as ranging between 5 and 60% by weight is suitable. The dry matter content of the dispersion can be adjusted by removing water, for example by evaporation, or adding water in a suitable manner.

As is explained in more detail below, the dispersion according to the invention can easily be transformed to a gel, for example using physico-chemical means, such as removing the electrostatic repulsion between the dispersion particles by changing pH or by adding an electrolyte, or a surfactant. Gel formation can also be carried out by drying the dispersion.

An object of the present invention is also a method for making the said dispersion comprising the steps of dissolving a particulate mineral material containing silica and alumina in a molar ratio of 2–12 in an aqueous solution, to form a solution containing nucleated re-precipitated particles from the material, stabilizing the so obtained solution to form a dispersion having a desired particle size, and optionally adjusting the dry matter content of the dispersion.

Preferably the particulate mineral material used as a starting material is a material having a glassy amorphous structure. Such a glassy structure has better dissolution properties than a crystalline structure, and are formed for example when mineral raw materials are molten and formed into fibres at high temperature. A suitable raw material is thus a mineral wool material or mineral fiber product, for example a waste or by product from mineral fiber production, such as spinning waste, unused fibres or products, as well as post-consumer mineral fiber products.

A mineral material suitable for use as a starting material contains $SiO_2$ in an amount of 35–45% by weight and $Al_2O_3$ in an amount of 8–25% by weight.

According to an advantageous embodiment a low alkali particulate mineral material contains, calculated as % by weight,

| | |
|---|---|
| $SiO_2$ | 35–45 |
| $Al_2O_3$ | 10–25 |
| $R_2O$ | 0.2–3, | wherein R means Na or K. In addition, such a material can contain, calculated as % by weight,

| | |
|---|---|
| CaO | 12–35 |
| MgO | 6–20 |
| FeO (total iron) | 2–10. |

A further suitable mineral material type is a material having the following composition, calculated as % by weight

| | |
|---|---|
| $SiO_2$ | 35–45 |
| $Al_2O_3$ | 8–13 |
| $R_2O$ | 0.2–1, | wherein R means Na or K. In addition, such a material can contain, calculated as % by weight,

| | |
|---|---|
| CaO | 30–40 |
| MgO | 5–11 |
| FeO (total iron) | 0.1–1. |

This composition is a typical composition for example for a slag wool product. Thus an advantageous starting material for making the dispersion can be a product or by-product obtained from the manufacture of slag wool.

The inclusion of earth alkali metal oxides has the further advantage of providing materials suitable for water resistant coatings and binders. Such inclusion is of special importance for example when used in briquettes, such as raw material briquettes for mineral wool production, or in ore briquettes, as well as for providing water resistant and stable coatings and adhesives.

Preferably the starting material used for forming the dispersion is in the form of a mineral wool material, especially obtained as a side or waste product from mineral wool production, as indicated above. A material can then be chosen which has the optimal or desired composition for the preparation of the dispersions according to the invention. Such waste materials are formed in large quantities, typically in amounts up to 20–30% by weight of the starting raw material, in the form of spinning waste, shots and unused fibers of rejected fibrous products (pre-consumer products). One applicable source for the material are also different constructions which are taken down and in which mineral wool material has been used, for instance, as heat insulation (post-consumer products). Such a waste material is already in finely divided, typically fibrous form and can thus be used as such, or alternatively it can also be divided to an even finer form to provide a product with a large surface area, such as 0.4 $m^2/g$ or larger, for example up to 25 $m^2/g$, and thus has good dissolution properties in the aqueous solution. Fibres obtained from mineral wool production typically have a diameter of 0.5 to 20, usually 2 to 15 $\mu m$, such as 3 to 5 $\mu m$ as measured with OM or SEM using a suitable method (e.g. Koenig et al, Analytica Chimica Acta 1993 280 289-298; Christensen et al, AM IND HYG ASSOC (54) May 1993), and a length of 0.5 to 50 mm, usually 2 to 20 mm, such as 3 to 10 mm.

The aqueous solution is an acidic solution, such as an aqueous solution made acidic by adding an inorganic or organic acid, such as HCl, $HNO_3$, $H_2SO_4$, $H_3PO_4$, formic, acetic, propionic acid or any other suitable mineral or organic acid. The pH of the solution is adjusted suitably. A low pH value results in a rapid dissolution of the mineral material to form a gel, the gelling time being dependent on the pH a lower pH resulting in a more rapid gelling than a higher pH. Good dissolution for a wide range of mineral materials is obtained at a pH of 0 to 6. The strength of the acid can be, depending on the acid used, from 0.1 to 10 M, such as 0.5 to 5 M.

The aqueous solution can also be an alkaline solution, such as an alkali metal or earth alkali metal hydroxy, carbonate or hydrocarbonate solution, especially a sodium, potassium or lithium hydroxide solution, or an ammonium hydroxide solution. Such a solution is preferably 0.1 to 2 molar with respect to the alkaline agent, or has a pH of 10 to 14, in order to easily dissolve also such mineral raw materials that are poorly soluble in neutral solutions.

At an alkaline pH the dispersion tends to be stable and an increase in particle size can be seen. By maintaining the dispersion at an alkaline pH for a suitable time, or by increasing the pH from appr. neutral to pH 10, an increase in particle size is obtained, the increase being less pronounced if the solution in addition contains salts. In the presence of sufficient quantities of salts, such as inorganic salts, e.g. sodium chloride, the particles tend to aggregate to form gels, which precipitate. The same gel formation will also take place by providing an acid pH to the solution, whereby a pH of appr. 2 to below 7 is suitable for gel formation.

Thus by adjusting the pH the dispersion state can be maintained, or the dispersion can be made to gel. The gel can be dispersed and stabilized by using high-shear mixing and raising the pH, and then again be brought to gelling by readjusting lowering) the pH, or by the addition of an electrolyte.

Alumina containing particulate mineral materials, especially such containing from appr. 10–25% by weight of alumina, are generally relatively poorly soluble in neutral solutions, but exhibit improved dissolution in acidic and alkaline media, thus providing aqueous dispersions containing dissolved silica and dissolved alumina in the desired ratio. According to the invention, when dissolving the material in an acidic solution, organic acids are preferred to inorganic acids. This is due to the fact that inorganic acids can form insoluble salt precipitations, for example with calcium and magnesium included in the starting material. Also some of the inorganic acids are highly corrosive and thus not preferred for obvious reason.

According to a preferred embodiment, the dissolution of the raw material is preferably carried out at an increased temperature, such as at a temperature of 80 to 100° C., preferably while simultaneously stirring, in order to facilitate the dissolution process. Dissolution takes place within a period from 1–2 hours up to 20 hours depending on the dissolving medium used and the solids content of the solution. Preferably an amount of starting mineral material is dissolved in the solution to provide a metal oxide containing solution which advantageously contains over 1%, preferably 5 to 60% by weight of dry matter, which is a suitable concentration for the subsequent use as a binder.

After the dissolution is complete, the material nucleates and re-precipitates to form a dispersion with the desired particle size. The subsequent stabilization of the dispersion is brought about by creating, in the solution, electrostatic repulsion between the particles. The electrostatic repulsion between the particles can be effected for example by providing suitable ions in the solution, or by changing the pH of the solution. If necessary, additional water can be added or removed, e.g. by evaporation, if necessary, for example for adjusting the viscosity of the solution obtained.

Stabilization may also be achieved by using suitable surfactants and/or polymers, especially non-ionic ones. Non-ionic surfactants and polymers can be preferred in some cases as they are not very sensitive to an environment which contains high concentrations of electrolytes and other chemicals, especially when the ionic strength is high. Examples of suitable polymers are polyethylene oxide and polyethylene glycol. Examples of suitable surfactants are nonylphenols, Tween and Span. In a typical situation, such surfactants and polymers are used in an amount of 0.5 to 2.5% by weight, calculated from the total solids of the solution. As stated above, the particle size of the dispersion can be adjusted by adjusting the pH.

According to the invention it is thus possible to provide dispersions containing predominantly silica in combination with other metal oxides stemming from the starting mineral material, such as calcium oxide, magnesium oxide, aluminium oxide, and possibly further metal oxides in smaller amounts. It is also possible to adjust the reaction conditions so as to obtain dispersions with a desired particle size. The dispersions so obtained can be made to gel either directly after formation, or only immediately prior to application, for example prior to application of the dispersion as a binder onto mineral fibres in mineral wool production. The dispersion can also be made to gel when heating or evaporating water when the final product is shaped.

The amount of dispersion to be used for any particular purpose can easily be determined by a person skilled in the art As an example it can be mentioned that when used as a binder in mineral wool production, the amount of binder generally is appr. 1 to 15% by weight, calculated as dry substance, of the weight of the product, for a normal insulating product, but it is naturally possible to use higher and lower amounts depending on the desired product and the reactivity of the binder. When used as a binder in foundry mould applications, a typical amount would be appr. 1 to 15%, such as 1 to 5% by weight of the total weight of the batch.

The following examples illustrate the invention, without limiting the same. Percentages are in percent by weight unless otherwise specified.

EXAMPLE 1

The binder according to the invention can be prepared in the following way.

7.5 g of mineral fibres containing 42.1% $SiO_2$, 17.4% $Al_2O_3$, 17.3% CaO 13.7% MgO, 5.8% FeO, 1.6% $Na_2O$, 0.6% $K_2O$, the balance being impurities, a fiber diameter of 3 to 4 μm and a fiber length of 3 to 10 mm, is mixed with 100 ml of a 5M solution of formic acid. For the mixing a high-shear mixer should be used to ensure effective mixing and to speed up the dissolution process. The dissolution is usually complete in 1 to 2 hours. When the fibres are completely dissolved a small amount of polymer, such as polyethylene glycol with a molar mass of 1000 to 10000, is added, appr. 1% by weight based on the total solids content of the solution. During the addition of the polymer, the solution is constantly mixed to stabilize the formed particles. By altering the amount of polymer and the time of addition, i.e. the point of time when all fibres have dissolved, the size of the sol particles can be changed to obtain optimal gelling and binding properties. The colloidal particle sol is then kept under continuous mixing to ensure that the polymer adsorbs to the surface of the particles.

When used as a binder for making mineral wool products, the binder so prepared can be applied by spraying onto mineral fibres in a conventional manner. The binder is cured and excess water is driven away by raising the temperature up to about 150° C.

The said binder can also be used as a binder in a briquette by mixing the binder with finely ground mineral raw material in a mixer, for example of Henschel type. It can be advantageous to add a small amount of water for forming the mixture in moulds. Curing is obtained by raising the temperature, but also air drying is possible.

EXAMPLE 2

2.1 g of fibres having a composition corresponding to that of Example 1, were dissolved in 100 ml of 1 M formic acid. After dissolution of the fibres, the solution was centrifuged to remove the impurities. The sample was then studied using light-scattering measurements. Nucleation of primary particles took place in the solution and the particles showed a steady growth, that is an increase in size with time, as is evident from the appended FIG. 1.

Figure 2:
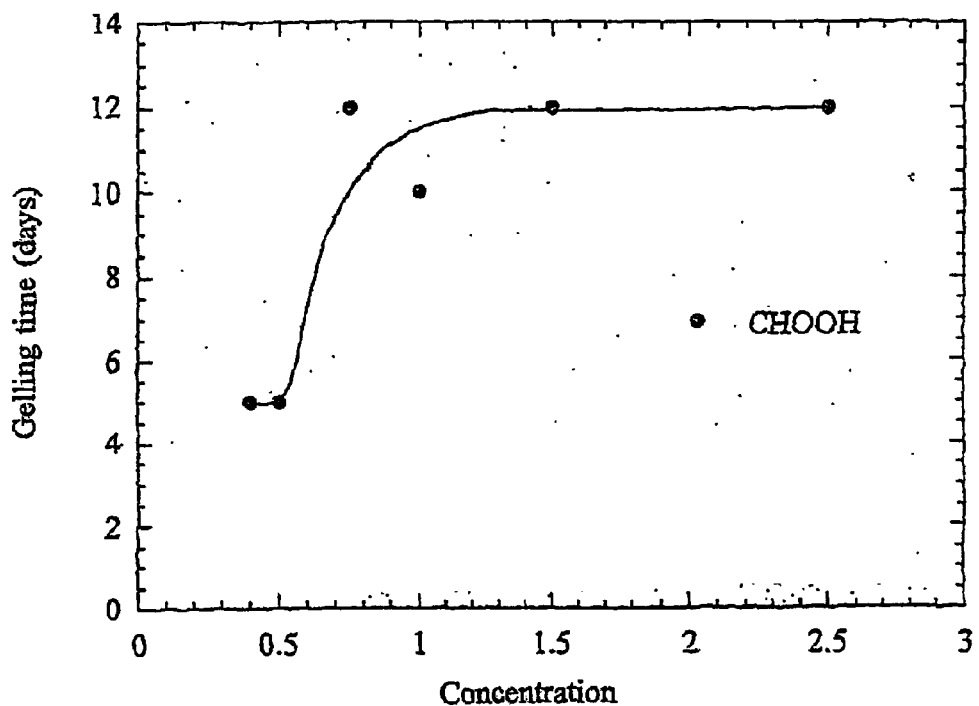

If the dispersion is not stabilized, it will gel over time as is evident from the appended FIG. 2, which illustrates tests carried out by dissolving 1.15 g of fibres having the composition given above, in 100 ml of formic acid of different concentrations. As can be seen from the FIG. 2, the gelling time varied between 5 and 12 days.

Figure 3:
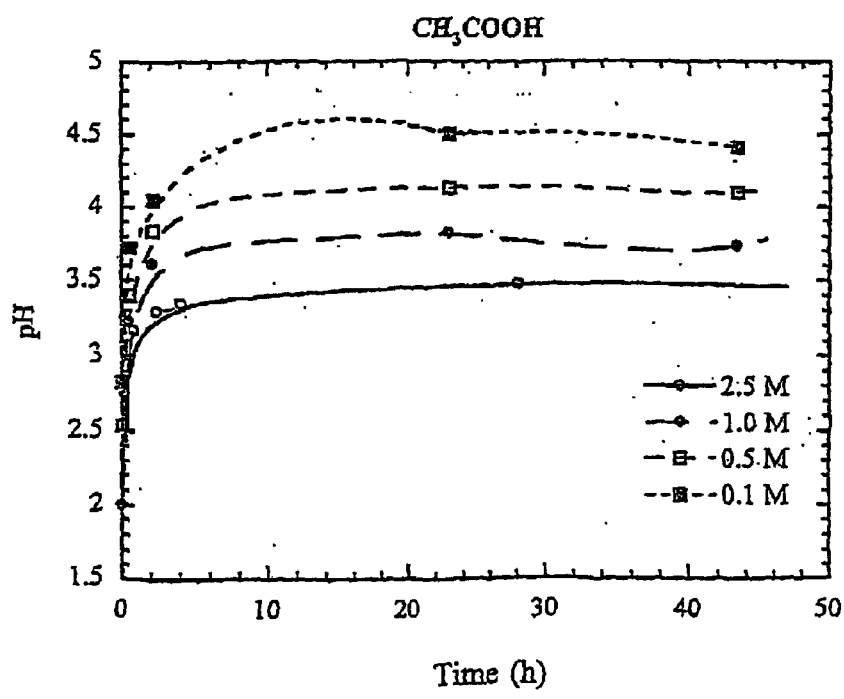

In order to study the pH behaviour as a function of time, 1.15 g of fibres having the composition given above, were dissolved in 100 ml of acetic acid of varying concentration, as indicated in the FIG. 3. Equilibrium pH was reached within a couple of hours indicating that the fiber material had dissolved. Lower concentrations of acid resulted in a higher pH, indicating that there was less acid remaining in the solution. At higher concentration of acid, more acid remained after the fibres had dissolved, thus keeping the pH at a lower level.

A similar test was carried out by dissolving 1.15 g of fibres (diameter 3–4 μm and length appr. 3–10 mm) having the composition given above, in 100 ml of formic acid with varying concentration. At low concentration, the required dissolution time was appr. 15 to 20 hours. When the concentration was increased, the dissolution time decreased to 1 to 2 hours.

What is claimed is:

1. A colloidal silicate dispersion comprising:
    silica;
    alumina;
    one or more alkali oxides;
    water,
    wherein the molar ratio between silica and alumina is 2 to 12, and the molar ratio between silica and the sum of alkali oxides is in the range of 10–350.

2. The dispersion according to claim 1, further comprising one or more members selected from the group consisting of:
    calcium oxide, magnesium oxide and iron oxide, where the molar ratio between silica and the sum of calcium oxide, magnesium oxide arid iron oxide is in the range of 0.5 to 2.

3. The dispersion according to claim 2, said molar ratio between silica and the sum of calcium oxide, magnesium oxide and iron oxide is in the range of 0.6 to 1.5.

4. The dispersion according to claim 1, wherein said colloidal silicate dispersion has a particle size of from 10 to 100 nm.

5. A gel comprising a gelled dispersion of said colloidal silicate dispersion of claim 1.

6. The colloidal silicate dispersion according to claim 1, comprising calculated as % by weight,

| | |
|---|---|
| $SiO_2$ | 35–45 |
| $Al_2O_3$ | 10–25 |
| $R_2O$ | 0.2–3, | wherein R means Na or K.

7. The colloidal silicate dispersion according to claim 6, comprising, calculated as % by weight.

| | |
|---|---|
| CaO | 12–35 |
| MgO | 6–20 |
| FeO | 2–10. |

8. The colloidal silicate dispersion according to claim 1, comprising, calculated as % by weight,

| | |
|---|---|
| $SiO_2$ | 35–45 |
| $Al_2O_3$ | 8–13 |
| $R_2O$ | 0.2–1, | wherein R means Na or K.

9. The colloidal silicate dispersion according to claim 8, comprising, calculated as % by weight.

| | |
|---|---|
| CaO | 30–40 |
| MgO | 5–11 |
| FeO (total iron) | 0.1–1. |

10. The colloidal silicate dispersion according to any one of claim 1 or 2 wherein said dispersion is alkaline.

* * * * *